(12) United States Patent
Adkins et al.

(10) Patent No.: US 8,006,545 B2
(45) Date of Patent: Aug. 30, 2011

(54) THERMOCOUPLE DATA ACQUISITION SYSTEM

(75) Inventors: Tom Adkins, Bloomdale, OH (US); Matthew B. Below, Findlay, OH (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 12/473,696

(22) Filed: May 28, 2009

(65) Prior Publication Data

US 2009/0293598 A1    Dec. 3, 2009

Related U.S. Application Data

(60) Provisional application No. 61/056,708, filed on May 28, 2008.

(51) Int. Cl.
*G01M 15/05*    (2006.01)
(52) U.S. Cl. .................... 73/114.01; 73/114.62
(58) Field of Classification Search ............... 73/114.01, 73/114.02, 114.62, 114.08
See application file for complete search history.

(56) References Cited

U.S. PATENT DOCUMENTS

| | | | | |
|---|---|---|---|---|
| 4,361,036 A | * | 11/1982 | Levenson .................. | 73/114.72 |
| 4,452,072 A | * | 6/1984 | Damson et al. ............. | 73/114.09 |
| 4,984,905 A | * | 1/1991 | Amano et al. .............. | 374/143 |
| 5,024,534 A | * | 6/1991 | Matsubara et al. .......... | 374/144 |
| 5,029,565 A | * | 7/1991 | Talbot ...................... | 123/406.28 |
| 5,374,822 A | * | 12/1994 | Steinke et al. ............. | 250/231.1 |
| 5,499,497 A | * | 3/1996 | DeFreitas ................... | 60/776 |
| 5,669,714 A | * | 9/1997 | Runne ....................... | 374/208 |
| 5,763,769 A | * | 6/1998 | Kluzner .................... | 73/114.09 |
| 2007/0152557 A1 | * | 7/2007 | Packard ..................... | 313/129 |
| 2009/0080492 A1 | * | 3/2009 | Takeuchi .................... | 374/144 |
| 2010/0082219 A1 | * | 4/2010 | Ma .......................... | 701/102 |

* cited by examiner

*Primary Examiner* — Eric S McCall
(74) *Attorney, Agent, or Firm* — Cantor Colburn LLP

(57) ABSTRACT

A method of real-time analysis of an engine, comprising sensing a temperature within a chamber of the engine with a thermocouple sensor disposed on a spark plug operating within the chamber, the thermocouple sensor generating a first signal based upon the temperature within the chamber; detecting current on a wire coupled to the sparkplug with a sensor, the sensor generating a second signal based upon current detected on the wire; converting the first and second signal into a first and second optical signal respectively utilizing one or more signal conditioners; generating a first and second digital signal based upon the first and second optical signal respectively with a receiver; and transmitting the first and second digital signal to an analysis device to generate a display of the temperature as it relates to engine speed at a first time in response to the receipt of the first and second digital signal.

20 Claims, 4 Drawing Sheets

THERMOCOUPLE DATA ACQUISITION SYSTEM

CROSS-REFERENCE TO RELATED APPLICATIONS

This application claims the benefit of U.S. Provisional Patent Application Ser. No. 61/056,708, filed on May 28, 2008, the contents of which are incorporated herein by reference thereto.

FIELD OF THE INVENTION

Exemplary embodiments of the present invention relate to methods and systems for gathering and analyzing data pertaining to the operation of an engine. In one particular exemplary embodiment, the data obtained from the engine relates to combustion chamber temperature and rotational speed of the combustion engine, wherein the data is collected and provided to a user in a real-time basis (e.g., during operation of the engine).

BACKGROUND

Engine performance is an important factor for ascertaining fuel efficiency and emission production of an internal combustion engine. Of the many ways for determining engine performance, one method is by determining the temperatures of a combustion chamber during operation. By determining the combustion temperature and amount of fuel injected to the combustion chamber, it is possible to determine how efficiently the fuel within the combustion chamber is being burned.

Past attempts to determine these temperatures have utilized thermocouple temperature sensors located within the combustion chambers. However, prior methods have not been entirely accurate. For example, surrounding components of the internal combustion engine often cause interference with temperature signals of the combustion chamber. Also, the temperature of the combustion chambers are not correlated to other operational conditions of the engine, such as fuel injection rate, engine speed or otherwise. Still further, other variances in the engine system and detection system often fail to provide for calibration of the sensing system such as specific location of temperature sensors or otherwise.

SUMMARY OF THE INVENTION

Exemplary embodiments of the present invention relate to methods and devices for gathering an analyzing data related to the operation of an engine. In one particular exemplary embodiment, a method of real-time analysis of an engine is provided. The method comprises sensing a combustion temperature within a chamber of the engine with a thermocouple sensor disposed on a spark plug operating within the chamber, the thermocouple sensor generating a first signal based upon the combustion temperature within the chamber; detecting current on an electrical power connection to the spark plug with a current sensor, the current sensor generating a second signal based upon current detected on the electrical power connection; converting the first and second signal into a first and a second optical signal respectively utilizing one or more signal conditioners; generating a first and a second digital signal based upon the first and second optical signal respectively with a receiver; and transmitting the first and second digital signal to an analysis device, the analysis device is configured to generate a visual display of the combustion temperature as it relates to an engine speed of the engine at a first time in response to the receipt of the first and second digital signal In another particular exemplary embodiment, a method of real-time engine analysis is provided. The method, comprising: sensing a combustion temperature within a chamber of the engine with a thermocouple sensor disposed on a spark plug operating within the chamber, the thermocouple sensor generating a first signal based upon the combustion temperature within the chamber; detecting current on an electrical power connection to the spark plug with a current sensor, the current sensor generating a second signal based upon current detected on the electrical power connection; converting the first and second signal into a first and a second optical signal respectively utilizing one or more signal conditioners; generating a first and a second digital signal based upon the first and second optical signal respectively by a receiver, the receiver configured to correct the combustion temperature of the first digital signal with a predetermined correction factor; and transmitting the first and second digital signal to an analysis device, the analysis device is configured to generate a visual display of the corrected combustion temperature as it relates to an engine speed of the engine at a first time in response to the receipt of the first and second digital signal.

In another particular exemplary embodiment, a real-time engine analysis system is provided. The system, comprising: a thermocouple sensor disposed on a spark plug operating within a combustion chamber of the engine, the thermocouple sensor is configured to generate a first signal based upon a combustion temperature within the chamber; a current sensor disposed proximate to an electrical power connection of the spark plug, the current sensor is configured to monitor electrical current on the electrical power connection and generate a second signal based upon current detected on the electrical power connection; one or more signal conditioners configured to generate a first and a second optical signal based upon the first and second signal respectively; a receiver electrically connected to the first signal conditioner and the second signal conditioner, the receiver is configured to generate a first and a second digital signal based upon the first and second optical signal respectively; and an analysis device in signal communication with the receiver, the analysis device configured to receive the first and second digital signal and configured to generate a visual display of the combustion temperature as it relates to an engine speed of the engine at a first time in response to the receipt of the first and second digital signal.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DETAILED DESCRIPTION OF EXEMPLARY EMBODIMENTS

Exemplary embodiments of the present invention relate to methods and systems for gathering and analyzing data related to the operation of an engine. Through the features in exemplary embodiments of the present invention, it is possible to more accurately analyze the combustion process of one or more cylinders of an internal combustion engine. In one exemplary embodiment this is achieved through the reduction of signal interference of a thermocouple signal. In another exemplary embodiment this is also achieved through the correlation of engine speed with the thermocouple input. Through the features of exemplary embodiments of the present invention, real-time analysis of a combustion process of an engine is possible. For example, it is possible to provide real-time display (e.g., graphical, tabular or otherwise) of operating conditions of the combustion chambers, average operating conditions, averaged buffered or corrected data relating to the operating conditions of the combustion chamber or otherwise.

As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
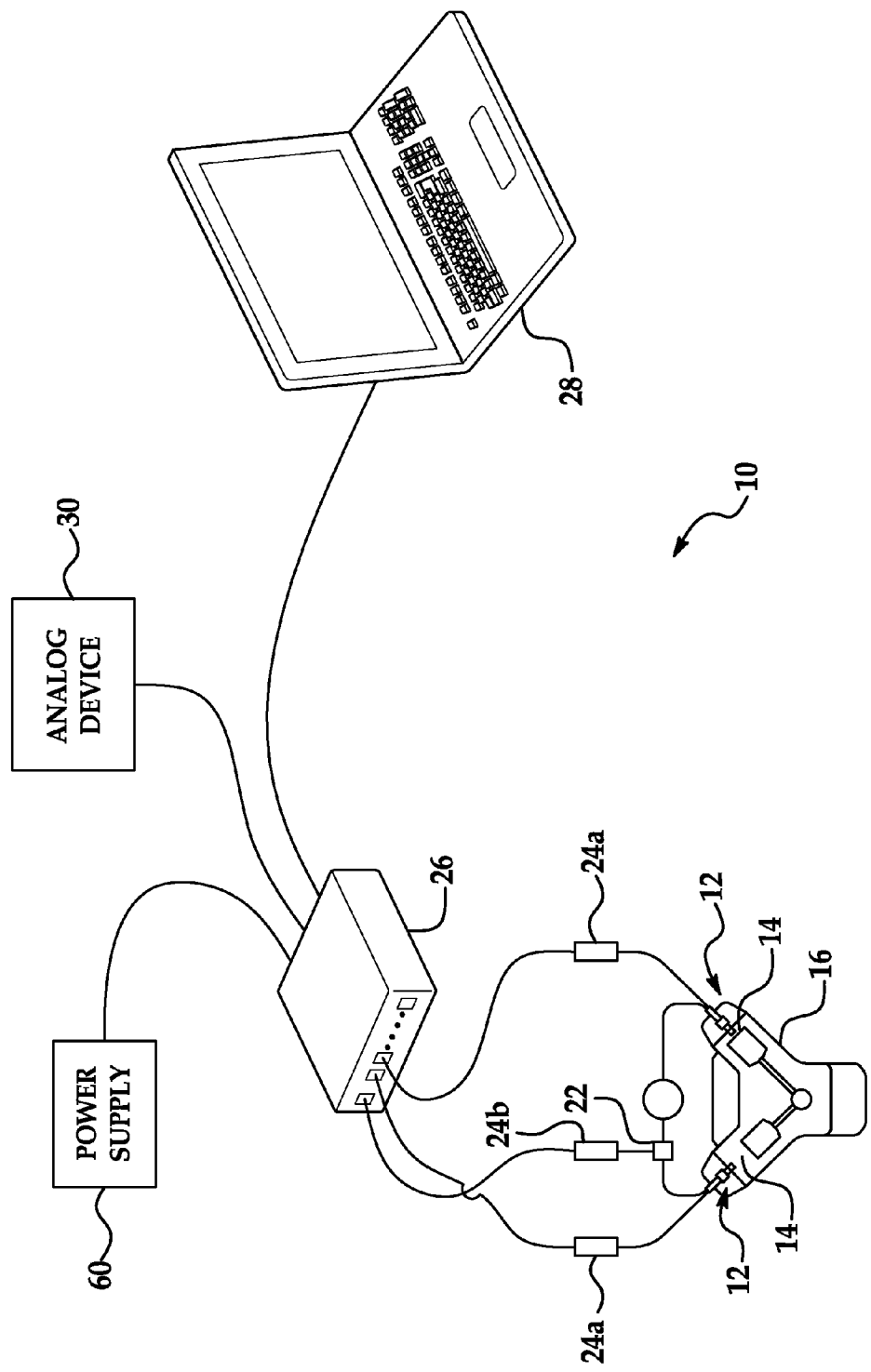
FIG. 1 illustrates a schematic view of a thermocouple data acquisition system according to an exemplary embodiment of the present invention.
Figure 2:
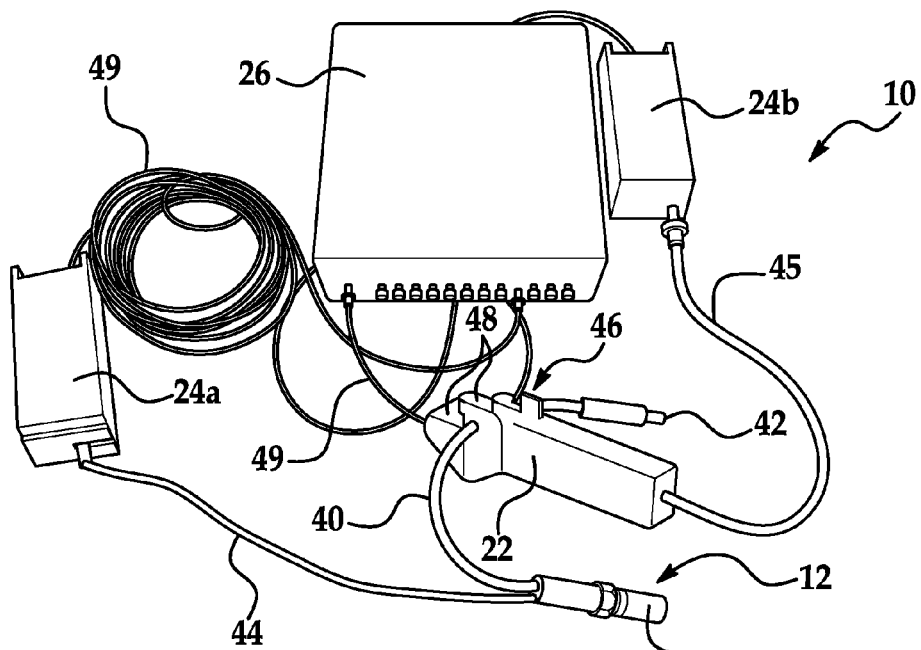
FIG. 2 illustrates components of a thermocouple data acquisition system according to an exemplary embodiment of the present invention.

In general, referring to an exemplary embodiment shown in FIGS. 1 and 2, a real-time analysis system 10 is provided. The system includes one or more thermocouple spark plug systems 12 mounted in thermal communication with a combustion chamber 14 of an engine 16 shown in part. In accordance with one exemplary embodiment, the thermocouple spark plug systems 12 include a thermocouple sensor 18 located on a spark plug 20 and are configured to measure the temperatures within the combustion chambers. The thermocouple spark plug systems 12 are further configured to generate a signal based upon temperatures within the combustion chambers and more particularly during combustion in accordance with one embodiment. The temperature measured within the combustion chamber provides indication of the temperature of the spark plug, which is being operated within the combustion chamber.

The system 10 also includes a current sensor 22 configured to detect the electrical current flowing to the spark plug 20 and is configured to generate a signal proportional to the detected current flowing to the spark plug 20. This generated signal can be used to derive an operating speed (i.e., revolutions per minute (RPM)) of the engine 16. The signals generated by the thermocouple sensors 18 are received by signal conditioners 24a. The signal generated by the current sensor 22 is received by signal conditioner 24b. The signal conditioners 24a, 24b can generate optical signals based upon the signals received from the thermocouple sensors and the current sensor respectively.

The system 10 further includes a thermocouple data acquisition system (TDAS) or an optical signal receiver 26 configured to receive the optical signals generated by the signal conditioners 24a, 24b and further configured to generate one or more digital signals and/or one or more analog signals based upon the optical signals. The optical signal receiver 26 comprises a combination of hardware and/or software/firmware with a computer program that, when loaded and executed, permits the device to operate such that it carries out the methods described herein.

The optical signal receiver 26 is in communication with an analysis device or a graphical computational device 28, such as a computer or other processing and display unit, and an analog device 30 or otherwise for providing information pertaining to combustion within the combustion chamber. In one exemplary embodiment, temperatures within the combustion chambers can be viewed on a real-time basis (e.g., with little to no appreciable time gap between temperature sensing and visual display) in combination with other operating conditions of the engine such as engine speed, fuel/air flow rate into the engine, power load or otherwise. The temperatures measured within the combustion chambers can form an indication of whether or not the heat range of the spark plug, in which the thermocouple sensor is located on, is properly matched to the engine. If the temperature of the spark plug is too cold, carbon deposits will accumulate and eventually foul the spark plug. If the temperature of the spark plug is too hot, the fuel charge will be ignited prior to normal spark ignition resulting in what is known as "preignition".

In one exemplary operation, the thermocouple sensors 18 are located on the spark plugs being operated within the combustion chambers 14 of the engine 16. The thermocouple sensors each generate a signal based upon the temperatures within the combustion chambers, particularly during combustion therein. These signals travel to the signal conditioners 24 where they are converted to optical signals and further transmitted to the optical signal receiver 26. The optical signal receiver 26 generates digital signals based upon the optical signals and transmits the digital signals to the graphical computational device 28. Optionally or in addition, the optical signal receiver 26 generates analog signals based upon the optical signals and transmits the analog signals to an analog device 30. The graphical computational device 28 provides a real-time display of the temperatures of the combustion chambers and indicates the speed of the in response to the receipt of the digital signals.

In accordance with one embodiment, the optical signal receiver 26 is configured to modify or correct the thermocouple data (e.g., temperatures within the combustion chamber) with a correction factor that is based upon the configuration of the engine and/or analysis system, such as, for example, the specific location of the thermocouple sensor within the combustion chamber, components of the engine and/or analysis system (e.g., type of spark plug), or otherwise. In one embodiment, the optical signal receiver 26 can receive the correction factor from the graphical computational device 28 and correct the thermocouple data of the digital signals and/or analog signals prior to transmitting the same to the graphical computational device. As such, the digital signals and the analog signals transmitted to the graphical computational device 28 and the analog device 30 respectively can include the corrected thermocouple data. In an alternate embodiment, the graphical computational device 28 modifies or corrects the thermocouple data of the digital and/or analog signals with the correction factor. In this embodiment, the corrected thermocouple data can then be sent to the optical signal receiver 26 for transmission to the analog device 30.

Figure 3:
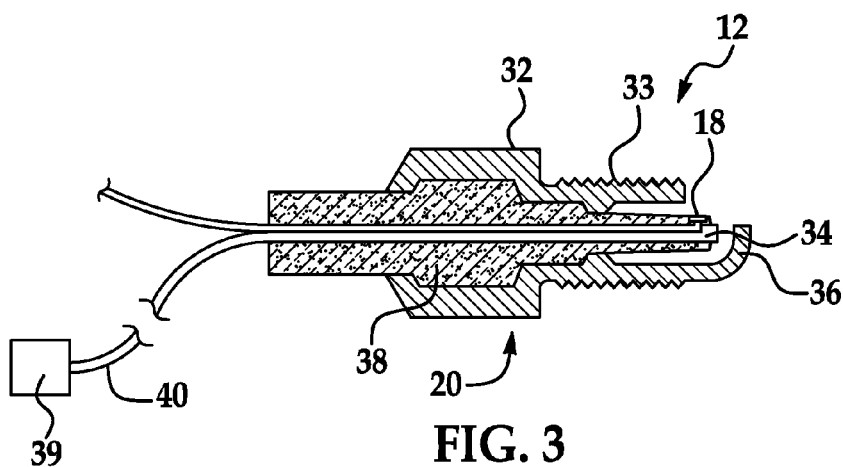
FIG. 3 illustrates a cross-sectional view of a thermocouple spark plug according to an exemplary embodiment of the present invention according to an exemplary embodiment of the present invention.

In greater detail, with reference to the exemplary embodiments shown in FIGS. 2 and 3, the real-time analysis system 10 includes one or more thermocouple spark plug systems 12. The thermocouple spark plug systems are in thermal communication with one or more combustion chambers 14 of the engine 16. In one configuration, the thermocouple spark plug system is provided for each of the combustion chambers (e.g., cylinder) of the engine. The thermocouple spark plug system 12 generally includes an outer shell 32 configured to house one or more components of the thermocouple spark plug system. The outer shell also includes a threaded portion 33 for mounting the system to the engine. The thermocouple spark plug system further includes a center electrode 34 and ground electrode 36 for generation of a spark suitable for igniting an air/fuel mixture within the combustion chamber. The center electrode is insulated from the outer shell and ground electrode through insulator 38. The center electrode is connected to a power source 39 through spark wire 40. The power source 39 can be a distributor, coil pack, coil on plug or any other device in accordance with one exemplary embodiment. Of course, other power generating or transmitting devices can be used in other exemplary embodiments and should not be limited to the example described herein. This connection may be further improved upon through a suitable connector 42.

Figure 4:
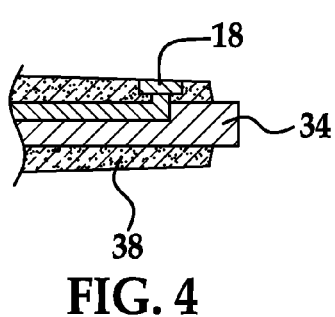
FIG. 4 illustrates an enlarged portion of the thermocouple spark plug shown in FIG. 3 according to an exemplary embodiment of the present invention.
Figure 5:
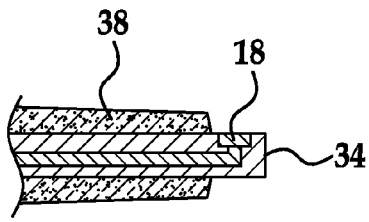
FIG. 5 illustrates an alternate configuration of the enlarged portion shown in FIG. 4 according to an exemplary embodiment of the present invention.

Referring to FIG. 3, the thermocouple spark plug system further includes thermocouple sensor 18 located on the spark plug operating within the combustion chamber. In one exemplary embodiment, the thermocouple sensor is disposed along insulator 38 and is spaced from the center and ground electrodes as shown in FIG. 4, which is an exploded view of a portion of the thermocouple spark plug shown in FIG. 3. In another exemplary embodiment, with reference to FIG. 5, the thermocouple sensor 18 is disposed on or along the center electrode. The thermocouple sensor is in communication with the signal conditioner 24a through signal wire 44. The thermocouple sensor 18 operates by generating electrical current based upon the temperature within the combustion chamber. For example, as the temperature within the combustion chamber increases a thermal gradient is formed across the thermocouple sensor resulting in the formation of potential energy (e.g., voltage) and a current. This current travels as a signal to the signal conditioner 24a where it is converted or modified to an optical signal.

The real-time analysis system 10 also includes current sensor 22 configured to monitor current to the spark plug 20. By monitoring current to the spark plug, and hence ignition within a combustion chamber, it is possible to ascertain the number combustions within a combustion chamber per minute, which further provides indication of the number of revolutions the engine undergoes per minute. In other words, the monitoring of current to the spark plug 20 provides indication of engine speed. In accordance with one exemplary embodiment, the optical signal receiver 26 determines or derives the engine speed (e.g., number of revolutions the engine undergoes per minute) based upon the optical signal from the signal conditioner 24b through one or a combination of predetermined algorithms, lookup tables or otherwise. The monitoring of current may be performed anywhere at or between the power source (e.g., ignition power supply, battery, alternator or otherwise) and the spark plug. For example, the monitoring may be based upon current transmitted from a coil, battery, alternator or other power generating or transmitting device to the spark plug. Once current has been detected, the current sensor generates and transmits a signal to the signal conditioner 24b.

In exemplary embodiments, referring to FIGS. 1 and 2, the monitoring of electrical current to the spark plug is achieved along the spark plug wire 40. In one configuration, the current sensor includes a clamp 46 configured for bringing opposing members 48 together adjacent the wire, wherein one or both of the opposing members are configured to measure current traveling to the spark plug 20. The current sensor is further configured to generate signals to the signal conditioner 24b based upon sensed current along the spark plug wire. In one exemplary embodiment, the current sensor transmits a signal every time current travels along the spark plug wire indicating the generation of spark with the spark plug. This signal is transmitted to the signal conditioner 24b through a signal wire 45.

The signals generated by the thermocouple sensor and the current sensor are received by one or more signal conditioners for converting the signals received into optical signals. The conversion of these signals to optical signals reduces the potential of electrical interference caused by surrounding components of the engine as can be appreciated by the skilled artisan. As the signal conditioners are contemplated as being located proximate to the thermocouple sensor and current sensor, it is contemplated that the signal conditioners are configured to withstand substantial amounts of heat emanating from the engine.

In one exemplary embodiment, a single signal conditioner is provided for both the thermocouple sensor and the current sensor. In another exemplary embodiment, a signal conditioner is provided for each of the thermocouple sensor and current sensor. Still further, a signal conditioner may be provided for each of the thermocouple sensors (i.e., one or more per cylinder of the engine or otherwise) in accordance with one exemplary embodiment. In any embodiment, the signal conditioner receives the signals from the thermocouple sensor(s) and current sensor(s) and converts the signals to optical signals to be received by the optical signal receiver 26 for further processing. Accordingly, the signal conditioners are in communication with the optical signal receiver through one or more optical cables 49, such as fiber optic wire or cable or otherwise.

The optical signals may be generated in any suitable configuration. For example, the signals from the thermocouple sensor and current sensor may be pulse modulated, width modulated or both. In one exemplary embodiment, the signal conditioner converts the signals to a pulse modulated optical signal. Also, the signal conditioner may be configured for calibration.

In accordance with one exemplary embodiment, the optical signal receiver 26 receives optical signals generated by the signal conditioners. In one exemplary embodiment an optical signal receiver is provided for each cylinder bank (e.g., 2 or more) of an engine. It is also contemplated that an optical signal receiver may be provided for each cylinder or thermocouple sensor. Other configurations are contemplated and should not be limited to any configuration described herein.

The optical signal receiver 26 converts the optical signals to digital signals and/or analog signals for transmission to a computational device such as graphical computational device, analog device or otherwise. This conversion of optical signals to digital signals and/or analog signals may be achieved through module, devices and configurations known in the art. For example, the optical signal receiver may include one or more signal converting modules for converting the optical signals to digital signals and/or analog signals to be received by the graphical computational device 28 and/or analog device 30.

In accordance with one exemplary embodiment, the optical signal receiver 26 includes a plurality of thermocouple channels or thermocouple input ports 50 for receiving signals collected from the one or more thermocouple sensors 18 via the one or more signal conditioners. The optical signal receiver further includes at least one current channel or current input port 52 for receiving signals collected from the current sensor 22 via one or more signal conditioners. In accordance with one exemplary embodiment, the thermocouple channels are in communication with one or more signal converting modules located within the optical signal receiver, which are in further communication with one or more output channels and connectors. Accordingly, each channel may be directed towards a signal converting module where the signals are converted and then travel along another channel to exit the optical signal receiver 26.

Figure 6:
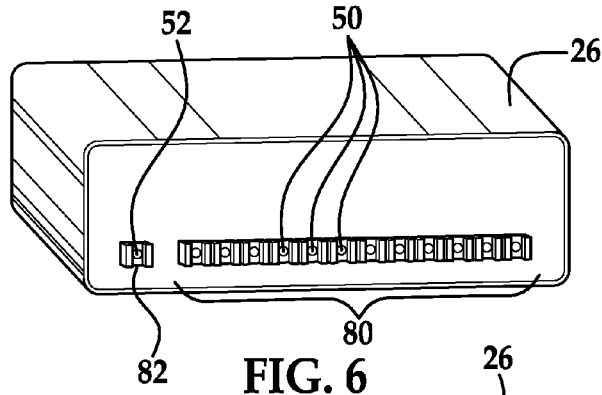
FIG. 6 illustrates an end view of an optical signal receiver according to an exemplary embodiment of the present invention according to an exemplary embodiment of the present invention.
Figure 7:
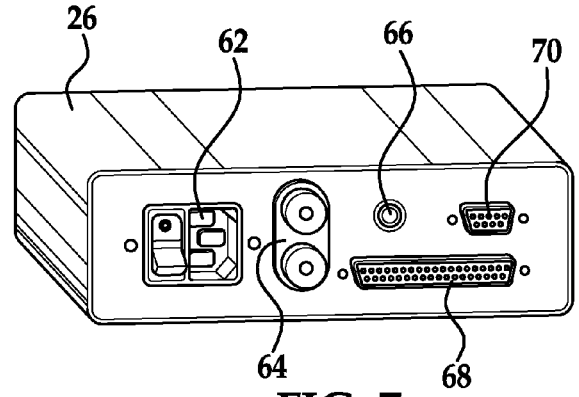
FIG. 7 illustrates another end view of an optical signal receiver according to an exemplary embodiment of the present invention.

The optical signal receiver can be powered by a suitable power supply 60. In one exemplary embodiment, referring to FIGS. 6 and 7, the optical signal receiver 26 further includes an alternating current power connector 62, a direct current power connector 64 and a power indicator 66. Accordingly, it is contemplated that the optical signal receiver is configured for being power through a suitable alternating current source, such as a 110V source, 220V source or otherwise. Similarly, the optical signal receiver may be configured for being power through a suitable direct current source, such as 12V or 24V vehicle battery or otherwise. The optical signal receiver further includes a digital connector 68 and an analog connector 70 for the transmission of signals to other devices, such as the graphical computational device, analog signal converter, analog device or otherwise.

The optical signal receiver also includes a plurality of thermocouple input connectors 80 configured for placing the plurality of optical wires in communication with the plurality of thermocouple channels 50 within the optical signal receiver. It is contemplated that the number of connectors may be equal to the number of channels. It is further contemplated that the optical signal receiver includes a number of thermocouple channels and thermocouple input connectors as combustion chambers or cylinders of an engine, number of spark plugs of an engine or otherwise. Accordingly, the optical signal receiver may include 4, 6, 8, 12, 16, 24 or more thermocouple channels and thermocouple input connectors. The thermocouple input connectors may comprise any suitable optical wire connector. The optical signal receiver further includes a current input connector 82 configured for placing the optical wire associated with the current sensor in communication with the current channel 52 of the optical signal receiver. The thermocouple input connectors and current input connector are in communication with the digital connector 68, the analog connector 70 or both for providing transmission of the optical signals, in digital form, to the graphical computational device, in analog form to the analog converting device, or both.

In one exemplary embodiment, the digital signals generated from the one or more optical signal receivers are transmitted to a graphical computational device for analysis and display. Accordingly, the graphical computational device includes a suitable connector for receiving signals from the optical signal receiver, via the digital connector 68. Corresponding connectors and conduits may comprise any suitable connector/conduit configuration such as serial port connection, parallel port connection, USB connection or otherwise. In one exemplary embodiment, the graphical computational device comprises a computer such as a lap top, desk top or otherwise. The graphical computational device includes a combination of hardware and/or software/firmware with a computer program that, when loaded and executed, permits the device to operate such that it carries out the methods described herein, such as providing graphical representations of data received from the one or more optical signal receiver. The graphical representations may be in the form of tabular displays, charts, graphs or otherwise for demonstrating combustion chamber/spark plug temperature and engine speed as they relate to each other and as they relate to time while the engine is operating. In one embodiment, the graphical computational device is configured to generate a graphical display demonstrating a moving average of the combustion chamber temperature and engine speed as they relate to each other and as they relate to time while the engine is operating.

Figure 8:
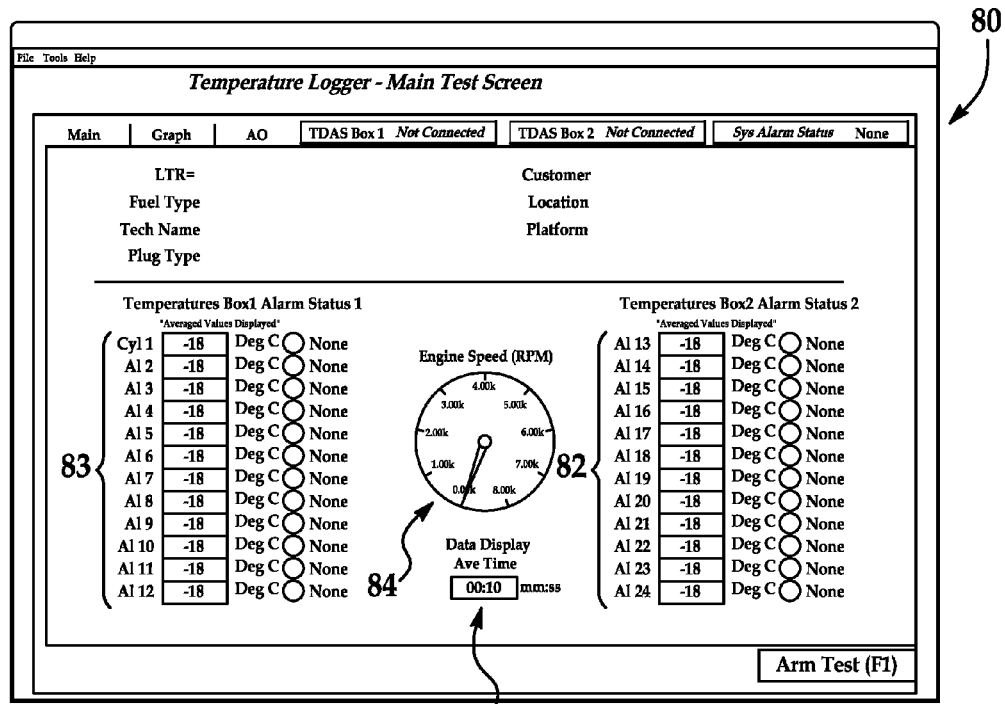
FIG. 8 illustrates a visual output of an analysis device according to an exemplary embodiment of the present invention.
Figure 9:
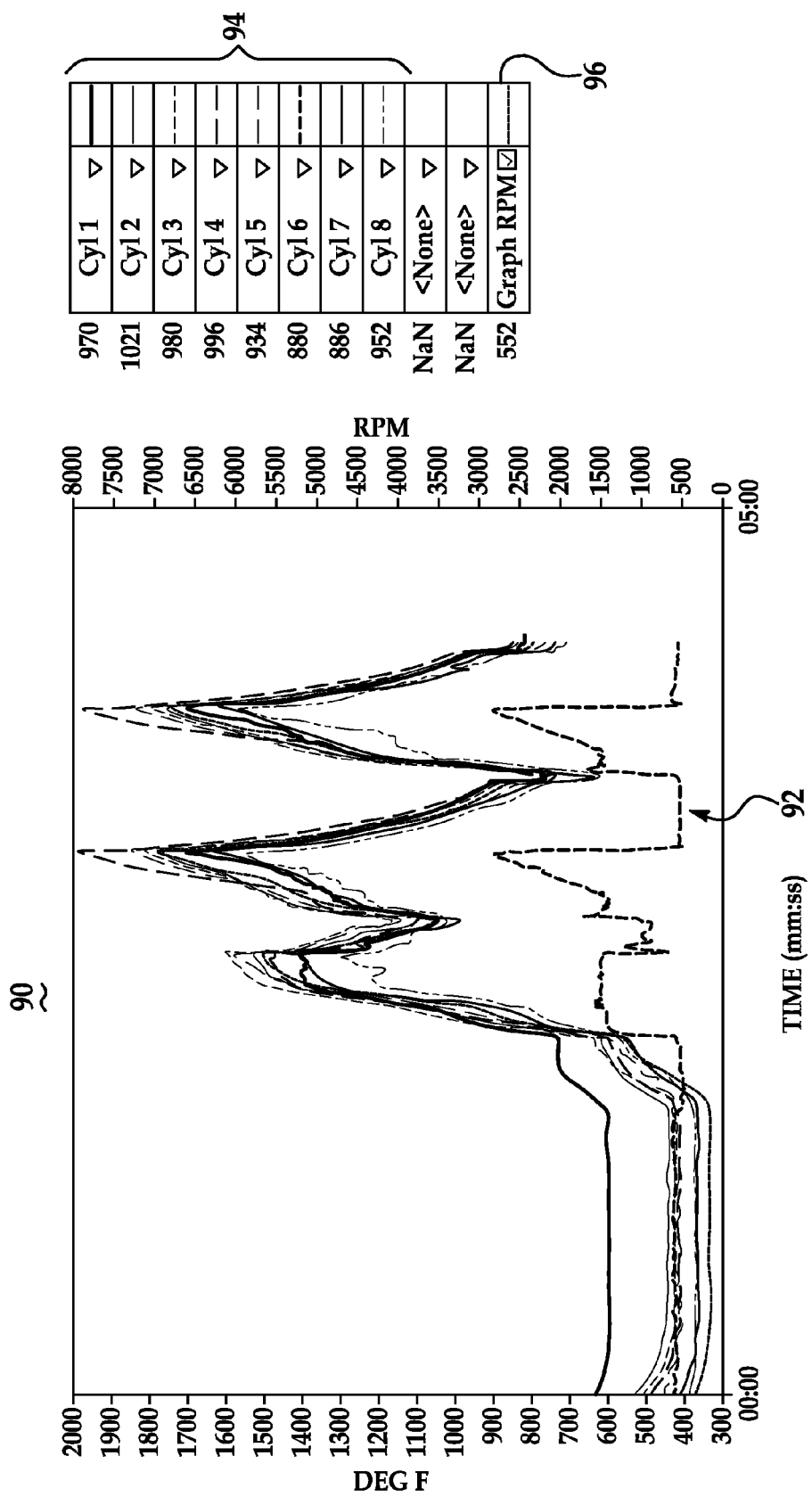
FIG. 9 illustrates a visual output of an analysis device according to an exemplary embodiment of the present invention.

For example, referring to FIG. 8, an exemplary visual display 80 is shown. The visual display includes a plurality of temperature columns 83, each representing a channel in communication with a thermocouple sensor located within a combustion chamber. The visual display also includes a revolution per minute (RPM) indicator 84 demonstrating engine speed. The visual display further includes a counter 86 providing indication of running time of the real-time analysis system. In another example, referring to FIG. 9, another exemplary visual display 90 is shown. This visual display comprises a graph 92 having a plurality of thermocouple sensor indicators 94 and an RPM indicators 96, wherein each indicator includes a different visual indicia, such as color, line weight, line continuity or otherwise. The graph 92 displays the temperature and engine speed over a predetermined period time in which the real-time analysis system is running. In this example, thermocouple data and RPM data are taken over a five-minute period of time. It should be appreciated that other information of the real-time engine analysis system 10 may also be displayed, such as average temperature of each combustion chamber cylinder, each bank of cylinders or all of the combustion chambers. Also, other types of visual displays are also contemplated, such as other charts, graphs or otherwise. In one exemplary embodiment, the optical signal receiver or the graphical computational device averages the thermocouple data and the RPM data collected from the thermocouple sensors and the current sensor respectively and stores the same in a buffer for future analysis in accordance with one embodiment.

In one exemplary embodiment, the optical signal receiver 26 is configured to modify or correct data relating to the thermocouple sensor, current sensor or both. For example, in one configuration, the optical signal receiver 26 is configured to correct for specific location of the thermocouple sensor within the combustion chamber by a predetermined correction factor. The predetermined correction factor may be a linear correction equation, multiplier or otherwise made to the data/temperature signal received by the optical signal receiver 26 to bring the sensed temperature of the combustion chamber to what is anticipated or expected. For example, in one configuration generation of a correction factor comprises placing a thermocouple sensor within a combustion chamber and igniting air/fuel within the combustion chamber to elevate the temperature within the combustion chamber to a known temperature. The correction factor is ascertained by determining the linear temperature change needed to modify the sensed temperature to the actual or anticipated temperature. The method may be used for different spark plug thermocouple configurations. It should be appreciated that other methods are available for correcting the sensed temperature.

In one exemplary embodiment, the graphical computational device generates the graphical display through one or more software interfaces/applications/modules installed therein. For example, the graphical computational device may include a LabVIEW™ based software interface serially connected to the optical signal receiver 26 for generating graphical displays as described above.

In another exemplary embodiment, the analog signals generated by the optical signal receiver may also be transferred to the analog device 30, which can be any customer analog recording device for logging data in accordance with one exemplary embodiment. This is particularly advantageous for incorporating the real-time analysis system to prior analog systems used for displaying information relating to temperature of a combustion chamber or otherwise. In particular, the signal may be particularly adjusted to specific analog devices including strip charts, recorders or otherwise, of various markets or companies. For example, the signal may be adjusted to include a signal voltage for a specific analog device. It is contemplated that the voltage can be adjusted between 0 to 10 volts, though other ranges are possible.

The digital signals generated by the optical signal receiver may be stored by the optical signal receiver, graphical computational device, analog device, removable storage device (e.g., flash member, hard drive) or otherwise. It is contemplated that the data may be generated and/or stored for any suitable time period. For example, the data may be continuously generated and/or stored for 2 minutes, 5 minutes, 10 minutes or otherwise.

Referring to the drawings, exemplary systems and methods for real-time analysis of an operating engine are shown. In one exemplary embodiment, a thermocouple sensor 18 is placed within a combustion chamber 14 of an engine 16. The thermocouple sensor is disposed on an end of a spark plug 20 configured for generation of a spark within the combustion chamber suitable to cause ignition of an air/fuel mixture therein. During combustion within the combustion chamber, the thermocouple sensor generates a signal that is received by the signal conditioner 24a and is indicative of the temperature within the combustion chamber. The signal conditioner 24a converts the generated signal to an optical signal and transmits the optical signal to the optical signal receiver 26 where a digital signal and/or an analog signal is generated based upon the optical signal. In accordance with one embodiment, the optical signal receiver 26 corrects the thermocouple data of the digital signal and/or analog signal with a predetermined correction factor before transmitting the signals to the graphical computational device and/or analog device. As such, the digital signal and/or analog signal include corrected thermocouple data. Simultaneously, a current sensor 22 is placed proximate to an electrical power connection to the spark plug. The current sensor detects the electrical current to the spark plug and generates a signal, which is received by the signal conditioner 24b and converted to an optical signal. The optical signal is transmitted to the optical signal receiver 26 where a digital signal and/or analog signal are generated based upon the optical signal. The generated digital signal and analog signal based upon the thermocouple sensor and current sensor are further transmitted to the graphical computational device 28 and the analog device 30 respectively for further processing. The data from the digital signals are graphically displayed to provide real-time observance of the temperature of one or more combustion chambers and rotational speed of the engine as they relate to time and to one another. Other modifications of the data may be further made. The graphical computational device may provide a moving average of the thermocouple data of the digital signals and display such data in real-time in a similar fashion as described above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of real-time analysis of an engine, comprising:
sensing a combustion temperature within a chamber of the engine with a thermocouple sensor disposed on a spark plug operating within the chamber, the thermocouple sensor generating a first signal based upon the combustion temperature within the chamber;
detecting current on an electrical power connection to the spark plug with a current sensor, the current sensor generating a second signal based upon current detected on the electrical power connection;
converting the first and second signal into a first and a second optical signal respectively utilizing one or more signal conditioners;
generating a first and a second digital signal based upon the first and second optical signal respectively with a receiver; and
transmitting the first and second digital signal to an analysis device, the analysis device is configured to generate a visual display of the combustion temperature as it relates to an engine speed of the engine at a first time in response to the receipt of the first and second digital signal.

2. The method as in claim 1, wherein the one or more signal conditioners are each in signal communication with the receiver through a fiber optic cable.

3. The method as in claim 1, wherein the first digital signal includes combustion temperature data and the second digital signal comprises engine speed data.

4. The method as in claim 1, wherein the engine speed is measured in revolutions per minute.

5. The method as in claim 1, wherein the receiver includes a plurality of channels configured to receive one or more optical signals.

6. The method as in claim 1, wherein the receiver includes a first connector, the first and second digital signals are transmitted to the analysis device through the first connector.

7. The method as in claim 1, wherein the receiver generates a first and second analog signal based upon the first and second optical signal respectively, the first analog signal includes combustion temperature data and the second analog signal includes engine speed data.

8. The method as in claim 7, wherein the receiver includes a second connector, the first and second analog signals are transmitted to an analog device through the second connector.

9. The method as in claim 1, wherein the analysis device is configured to correct the combustion temperature of the first digital signal with a predetermined correction factor, the predetermined correction factor is based upon an expected combustion temperature.

10. The method as in claim 9, wherein the analysis device transmits the corrected combustion temperature to a storage device of the receiver.

11. The method as in claim 1, wherein the receiver is configured to correct the combustion temperature of the first digital signal with a predetermined correction factor prior to transmitting the first digital signal to the analysis device, the predetermined correction factor is based upon an expected combustion temperature.

12. The method as in claim 1, wherein the generation of the visual display is updated at least approximately once per second and the generation of the visual display is generally instantaneous with the generation of the first and second signal.

13. The method as in claim 1, wherein the visual display includes a table or chart demonstrating combustion chamber temperatures as they relate to engine speeds over a predetermined period of time.

14. A method of real-time analysis of an engine in operation, comprising:
   sensing a combustion temperature within a chamber of the engine with a thermocouple sensor disposed on a spark plug operating within the chamber, the thermocouple sensor generating a first signal based upon the combustion temperature within the chamber;
   detecting current on an electrical power connection to the spark plug with a current sensor, the current sensor generating a second signal based upon current detected on the electrical power connection;
   converting the first and second signal into a first and a second optical signal respectively utilizing one or more signal conditioners;
   generating a first and a second digital signal based upon the first and second optical signal respectively by a receiver, the receiver configured to correct the combustion temperature of the first digital signal with a predetermined correction factor; and
   transmitting the first and second digital signal to an analysis device, the analysis device is configured to generate a visual display of the corrected combustion temperature as it relates to an engine speed of the engine at a first time in response to the receipt of the first and second digital signal.

15. The method as in claim 14, wherein the predetermined correction factor is based upon an expected combustion temperature.

16. A real-time engine analysis system, comprising:
   a thermocouple sensor disposed on a spark plug operating within a combustion chamber of the engine, the thermocouple sensor is configured to generate a first signal based upon a combustion temperature within the chamber;
   a current sensor disposed proximate to an electrical power connection of the spark plug, the current sensor is configured to monitor electrical current on the electrical power connection and generate a second signal based upon current detected on the electrical power connection;
   one or more signal conditioners configured to generate a first and a second optical signal based upon the first and second signal respectively;
   a receiver electrically connected to the first signal conditioner and the second signal conditioner, the receiver is configured to generate a first and a second digital signal based upon the first and second optical signal respectively; and
   an analysis device in signal communication with the receiver, the analysis device configured to receive the first and second digital signal and configured to generate a visual display of the combustion temperature as it relates to an engine speed of the engine at a first time in response to the receipt of the first and second digital signal.

17. The system as in claim 16, wherein the one or signal conditioners are each in signal communication with the receiver through a fiber optic cable.

18. The system as in claim 16, wherein the receiver is further configured to generate a first and second analog signal based upon the first and second optical signal respectively.

19. The system as in claim 18, wherein the receiver includes a first connector and a second connector, the first and second digital signals are transmitted to the analysis device through the first connector and the first and second analog signals are transmitted to an analog device through the second connector.

20. The system as in claim 16, wherein the receiver is further configured to correct the combustion temperature of the first digital signal with a predetermined correction factor that is based upon an expected combustion temperature, the analysis device is configured to display the corrected combustion temperature as it relates with the engine speed at the first time through the visual display.

\* \* \* \* \*